United States Patent [19]
Pretsch, Jr.

[11] Patent Number: 5,655,306
[45] Date of Patent: Aug. 12, 1997

[54] VEHICLE MOUNTED BACKING DISTANCE GAUGE

[76] Inventor: Donald Charles Pretsch, Jr., 5237 Clifton St., Alexandria, Va. 22312

[21] Appl. No.: 417,245

[22] Filed: Apr. 5, 1995

[51] Int. Cl.⁶ .................................................. G01B 5/14
[52] U.S. Cl. ................. 33/286; 33/533; 33/645; 33/832; 116/28 R
[58] Field of Search ............... 33/286, 533, 600, 33/645, 700, 706, 783, 792, 802, 832, 833; 116/28 A, 28 R, 35 R, 203, 284, 285, 294, 295

[56] References Cited

U.S. PATENT DOCUMENTS

| | | |
|---|---|---|
| 855,865 | 6/1907 | Roost .................................. 33/802 |
| 986,296 | 3/1911 | Kavanagh et al. ................. 116/285 |
| 1,418,034 | 6/1922 | Tennent . |
| 1,726,129 | 8/1929 | Steinle .............................. 33/802 |
| 2,134,299 | 10/1938 | Cosner ............................. 116/285 |
| 2,731,934 | 1/1956 | Hausmann et al. . |
| 3,037,187 | 5/1962 | Blakistone ....................... 116/28 R |
| 3,187,710 | 6/1965 | Wilfert . |
| 3,219,972 | 11/1965 | Williams . |
| 3,232,265 | 2/1966 | Hurt . |
| 3,261,321 | 7/1966 | Mandl . |
| 3,603,279 | 9/1971 | Hooks . |
| 3,621,807 | 11/1971 | Kang . |
| 3,624,913 | 12/1971 | Ciampolini ........................ 33/501 |
| 4,036,165 | 7/1977 | Wood . |
| 4,070,645 | 1/1978 | Oreluk . |
| 4,101,868 | 7/1978 | Bubnich et al. . |
| 4,257,706 | 3/1981 | Smith . |
| 4,621,432 | 11/1986 | Law ................................... 116/28 R |
| 4,967,180 | 10/1990 | Wang . |
| 5,035,441 | 7/1991 | Murray ............................. 33/286 |
| 5,189,802 | 3/1993 | Bergfield . |
| 5,374,918 | 12/1994 | Tharbs . |

FOREIGN PATENT DOCUMENTS 2 102 608  2/1983  United Kingdom ................. 116/28 R

*Primary Examiner*—G. Bradley Bennett
*Attorney, Agent, or Firm*—Kerkam, Stowell, Kondracki & Clarke, P.C.; John C. Kerins

[57] ABSTRACT

A vehicle mounted backing distance gauge is provided, in which a plunger, normally biased to an extended position, extends approximately ten inches behind the vehicle, and as the vehicle is backed toward an object such as a loading dock, the plunger comes into contact with the object and retracts into a casing mounted to the driver's side of the vehicle. The plunger has an internal beam that moves in concert with the plunger, and through the use of a bevel gear pair and a follower arm controllably moved by the forward end of the internal beam, an indicator sign is rotated or pivoted by a shaft coupled to one of the bevel gears from a first position parallel to the side of the vehicle and extending toward the rear of the vehicle, to a diametrically opposed position parallel to the vehicle, but extending toward the front of the vehicle. The movement of the indicator sign is monitored by the driver, and the last increment of approach is highly visibly represented as a bright or high contrast flange face carried by the sign begins to, and ultimately does, disappear behind a wall of a sign housing protruding from the side of the vehicle.

20 Claims, 6 Drawing Sheets

VEHICLE MOUNTED BACKING DISTANCE GAUGE

BACKGROUND OF THE INVENTION

1. Field of the Invention

The present invention relates to a device to aid drivers of vehicles, truck drivers in particular, in backing the vehicle to a desired spacing from another object.

2. Description of Related Art

Vehicle drivers, particularly drivers of tractor-trailer vehicles or other trucks, are frequently required to back the vehicle into a parking space or loading dock. In the case of a loading dock, the trailer or truck must be backed into substantial contact, or into a very close spacing, with the loading dock, so that freight can be loaded and/or unloaded from the vehicle. This docking requirement, in the past, has led to numerous instances in which the wall of the loading dock, and/or the trailer, are damaged by the truck making contact at a slightly elevated speed, because the driver is unaware, until making contact, of the distance between the truck and the dock. Resilient dock bumpers tend to decrease this problem, but still provide little or no indication to the driver that the truck is nearing contact with the dock, as the bumpers readily compress and no impact is felt. The bumpers also do not provide a distance indication.

Devices have heretofore been proposed in the art for use in assisting the driver of a vehicle in backing the vehicle toward another object. One of these, disclosed in U.S. Pat. No. 1,418,034, issued to Tennent, provides an indicator to alert the driver of the distance between the body of the vehicle and an object to the rear of the vehicle. That device has significant disadvantages that would essentially prevent its use on modern-day cars and trucks. The Tennent device relies on the use of a retractable or compressible bumper in gauging the distance, and, with the current laws mandating the use of impact-resistant bumpers, a bumper that is designed to retract or compress at very low speeds is likely to be illegal. Further, a disadvantage of that design is that it relies on a cable system linking the bumper to the indicator in the passenger compartment of the vehicle, which, while possibly acceptable for cars, would not be acceptable for vehicles such as tractor-trailers, in which the tractor is separable from the trailer, and in many instances is used with numerous trailers.

Having an indicator in the passenger compartment, as shown in Tennent, is not as advantageous as it might first appear to be. In backing up a vehicle, the driver is generally looking outside the vehicle, either into the rearview mirror, or, more commonly, into the side view mirrors. This is particularly true of a driver backing a tractor trailer into, for example, a bay at a loading dock, in picking up or delivering the freight or cargo carried inside the trailer. The same is true of an automobile driver backing into a parking space between two other cars. If it were necessary to look in the passenger compartment to determine the current spacing between the rear of the vehicle and an approaching object, the driver would have to take his or her eyes off the mirrors, thus increasing the chances of inaccurately aligning the vehicle at the loading dock or in the parking space.

Other warning-type devices have been disclosed in the art, but generally do not provide any continuing indication of the decreasing distance between the vehicle and the object it is approaching. Examples of such devices can be found in U.S. Pat. Nos. 3,187,710 and 4,967,180. A sighting device is disclosed in U.S. Pat. No. 4,257,706, issued to Smith.

It is therefore a principal object of the present invention to provide a device to be mounted on a vehicle that will function as a distance gauge for use in alerting a driver backing up a vehicle of the distance between the rear of the vehicle and an object behind the vehicle.

It is a further important object of the present invention to provide a device that will provide a truck driver with ample advance warning of the decreasing distance between the rear of the truck and an object, such as a loading dock, so that the truck may be slowly and controllably backed into contact with the dock for loading and/or unloading freight or cargo.

It is an additional important object of the present invention to provide a vehicle mounted device providing a distance gauging function that is readily adaptable for effective use with vehicles of different sizes and constructions.

It is a further important object of the present invention to provide a rear distance gauging device that is viewable by the driver either in a side view mirror, or when the driver extends his or her head out the window and looks to the rear of the vehicle.

SUMMARY OF THE INVENTION

The above and other objects of the present invention are achieved in the present invention by providing a vehicle mounted distance gauge that is highly effective in indicating to a driver that his vehicle is closely approaching an object at the rear of the vehicle. The device is positioned at the side of the vehicle such that it can be viewed in the side view mirror, or directly by the driver if the driver is looking rearward from the window.

The distance gauge device employs a plunger that is normally carried by the vehicle, hereafter referred to generally as a truck, in a retracted position, and is then moved to an extended operating position when the vehicle is in the general proximity of the space or area which it is to be backed into. For purposes of simplicity, this space or area will hereafter be referred to as a loading dock, dock, or bay, even though it will be well understood that the device can be used with vehicles other than trucks, and may be used as a distance gauge for backing into close proximity to objects other than loading docks. The plunger extends rearwardly from the rear-most point of the vehicle to a distance of about 10–12 inches. As the vehicle is backed into the dock, when the vehicle closely approaches the dock, the plunger contacts the wall of the dock underneath the doorway of the bay.

The plunger is biased outwardly, but will be pushed in as the truck moves closer to the dock. The plunger is coupled to a pivotable sign which serves as the distance indicating means. The sign is secured to the truck in a position that will be in the view of the driver, through his driver's-side side view mirror and/or if the driver's practice is to lean out the window looking rearwardly when backing up to a dock. The sign is carried in a housing, and is not visible when the plunger is fully extended or fully retracted. The sign pivots out of the housing and rotates forward toward the driver. The sign has a top flange painted with a highly visible or high contrast coating on its outer surface, and, when the sign begins to return into the housing, the amount of that flange visible to the driver begins to decrease, and eventually disappears.

The coupling of the plunger to the sign is effected by an extension portion of the plunger interacting with an actuating arm on a first bevel gear, which interaction rotates the first bevel gear. A second bevel gear is meshed with the first pivot gear, and carries a shaft extending upwardly into the sign housing. The sign is secured to the shaft such that the turning of the bevel gears causes the sign to pivot. The gearing ratio is selected such that the sign will pivot through a 180° sweep as the plunger retracts the approximately 10–12 inches that it originally extended from the rear of the truck. The sign thus moves at a rate that will give the driver a highly effective way of gauging distance as his truck approaches in close proximity to a dock.

BRIEF DESCRIPTION OF THE DRAWINGS

These and other features of the present invention and the attendant advantages will be readily apparent to those having ordinary skill in the art and the invention will be more easily understood from the following detailed description of the preferred embodiment taken in conjunction with the accompanying drawings wherein like reference characters represent like parts throughout the several views.

DETAILED DESCRIPTION OF THE PREFERRED EMBODIMENT

Figure 1:
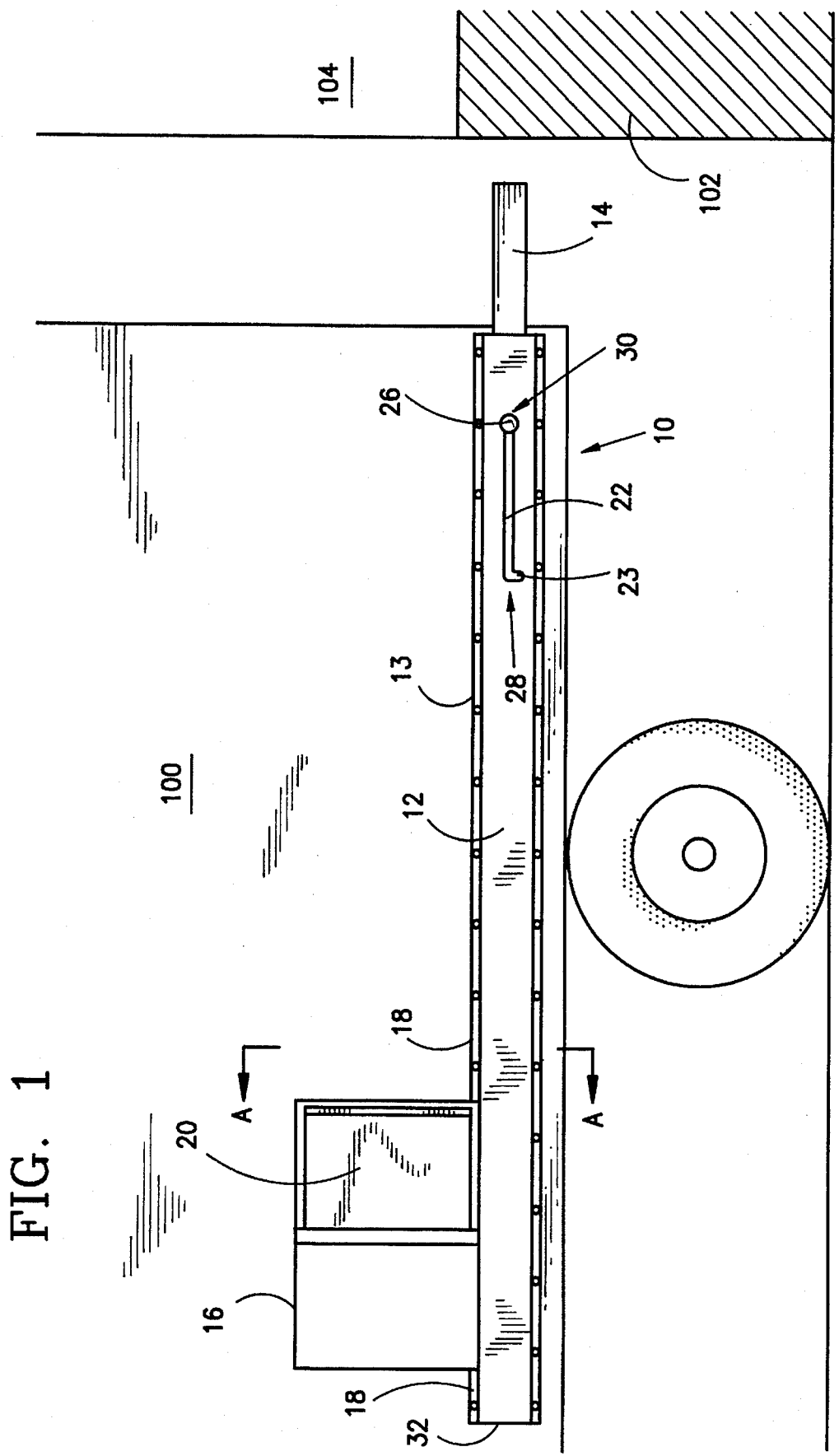
FIG. 1 is a side elevation view of a truck having a backing distance gauge according to a preferred embodiment of the present invention secured thereto.

Referring initially to FIG. 1, in accordance with a preferred embodiment of the present invention, a backing distance gauge assembly 10 is installed on a trailer 100 (hereafter "truck", generically) to be hitched to a tractor in a tractor-trailer combination for road transportation. The outer casing 12 of the assembly is secured to the side of the truck, as by a plurality of nut and bolt pairs, represented schematically at 13, which bolt through the skin of the truck to secure the casing to the I-beam frame behind the skin, in a manner that will be readily apparent to those of ordinary skill in the art.

The casing extends substantially horizontally along the driver's side of the truck at a height slightly above the lowest extent of the truck frame, and at a level that is sufficiently low such that a plunger 14 extending outwardly therefrom will be in a position to contact a wall 102 extending underneath an open bay 104 at a loading dock. The casing 12 preferably extends from a point spaced very close to the rearmost extent of the truck, for a length of several feet, for example, five or six feet, toward the front of the truck.

A sign housing 16 is mounted to the upper surface 18 of the casing 12 near the forward extent of the casing. The sign housing carries a sign 20 therein that is used to aid a driver, as will be discussed later, in gauging or judging the distance between the back of his truck 100 and the wall 102 of the dock. The sign housing 16 and sign 20 are thus positioned alongside the truck in a position that enables them to readily be seen by the driver from his rearview mirror, or by a driver leaning out his window and looking to the rear of the truck.

FIG. 1 also illustrates that the casing 12 has a slot 22 extending along part of its length. The length of the slot 22, generally on the order of ten to twelve inches, defines the length of travel of plunger 14, in that the extension 24 of the plunger extending internally in the casing 12 (see FIG. 2), has a fixed pin 26 secured to the extension that protrudes laterally outwardly therefrom, and is permitted to travel in the slot 22. The forward 28 and rear 30 extents of the slot will restrain pin 26 from further movement in those respective directions, thus also limiting the extent of travel of the internal plunger extension 24 and the plunger 14 itself.

Slot 22 has a catch 23 at the forward extent 28 of the slot, so that pin 26 can drop into the catch when the plunger is fully retracted, thus maintaining the plunger, which is biased toward its extended position, in its retracted state after the truck 100 has pulled away from the dock, and begins travel along the roadways. While it is not believed to be mandatory to provide a catch or other means for maintaining the plunger 14 in this retracted state, it is seen as being desirable to reduce the possibility of mishaps as the truck travels on the roadways. Further, although the provision of a catch will require the driver to exit the truck 100 to activate the plunger, i.e., to free the plunger 14 from the catch so that the plunger will move to its extended position, this is not likely to be viewed as a significant drawback in the case of a truck or tractor-trailer backing up to a loading dock. In such instances, prior to the driver making his close approach to the dock, he must exit the truck to open the doors at the rear of the truck or trailer, and thus must pass by the assembly 10 twice, allowing him to release the pin 26 from the catch 23.

Figure 2:
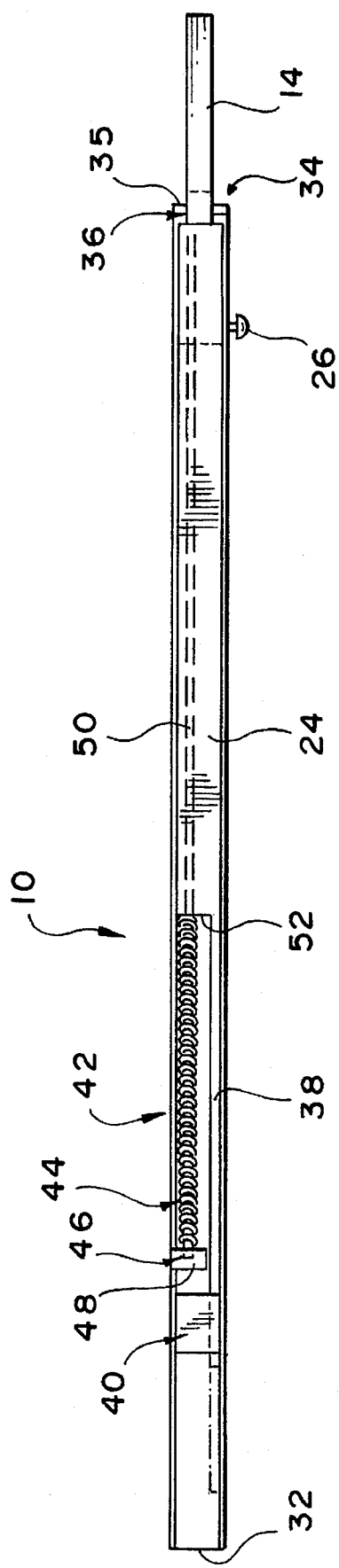
FIG. 2 is a top cutaway view of the backing distance gauge of the present invention.

Turning now to FIG. 2, a top cutaway view of the assembly 10 is illustrated. The outer casing 12 houses the plunger extension member 24 that is preferably made from one or more pieces of steel or aluminum plate stock. Casing 12 is also preferably made from plate stock, or may be made of a large thin walled hollow channel stock. Casing 12 has a cap 32 at a forward extent thereof, and also a cap 35 at its rear end 34, with rear cap 35 having an opening therein to permit the plunger 14 to move therethrough between its limits of travel. In order to keep the interior of the casing isolated from the outside environment, a rubber insert 36, such as a seal or boot, is secured to the rear cap 35, and the seal extends inwardly to surround plunger 14, preferably in complete contact with the external surface of the plunger.

The plunger extension member 24, which will also be referred to as the plunger beam 24, extends forward from the plunger 14 to a distance approximately twelve to eighteen inches short of the forward casing end cap 32. As seen in FIG. 2, the beam, which can be made of steel, aluminum, or other suitable rigid material, has a reduced width section 38 at its forward end. The reduced width section 38, when the plunger 16 is extended, terminates in the casing at a point substantially adjacent gearbox 40 (see also FIGS. 3 and 4).

Extending alongside reduced width section 38 is a biasing means 42, which, in the preferred embodiment, comprises a compression spring 44 surrounding a steel rod 46. The steel rod is further fixedly secured, using any suitable conventional fasteners or by welding (not shown), to stop block 48, with stop block 48 itself being mounted to the inner wall of casing 12. The steel rod extends from the stop block rearwardly into a bore 50 in plunger beam 24 for a distance of approximately one or two inches when the plunger 14 and plunger beam 24 are at the extended position. At the location where the beam 24 transitions to the reduced width section 38, the beam presents a spring-engaging surface 52 through which bore 50 extends, the surface 52 retaining the spring at the forward end of rod 46.

The spring is selected to be of a length such that a rearward biasing force is continuously maintained on the spring-engaging surface 52 of the beam 24, thereby maintaining the beam at its rearmost position and maintaining plunger 14 at its extended position, unless pin 26 is engaged in the catch 23, as discussed previously, at which point the biasing force is overcome by the retaining force of the pin and catch. In operation, as the plunger 14 and beam 24 are pushed inwardly as a result of the plunger engaging an object which the truck is backing toward, the spring will compress to allow the beam to move inwardly. The reduced width section 38 of the beam 24 moves past the stop block 48 and the spring assembly. The rear part of the beam is able to move forward as the steel rod 46 passes through bore 50. The plunger 14 is able to retract into the casing, as there will be sufficient offset or clearance from the steel rod such that there will be no interference with inward movement of the plunger.

Figure 3:
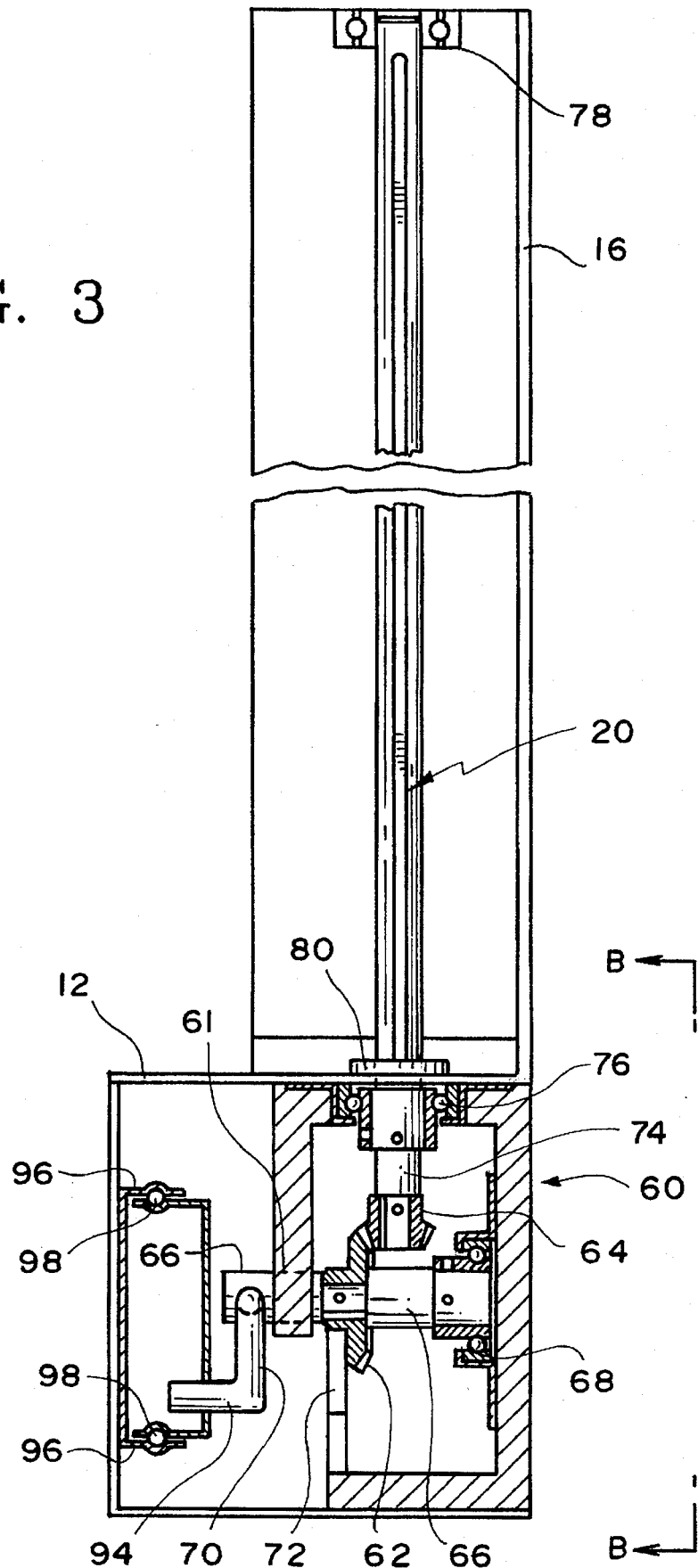
FIG. 3 is a sectional view of the gearbox and sign, as viewed in direction A—A in FIG. 1.
Figure 4:
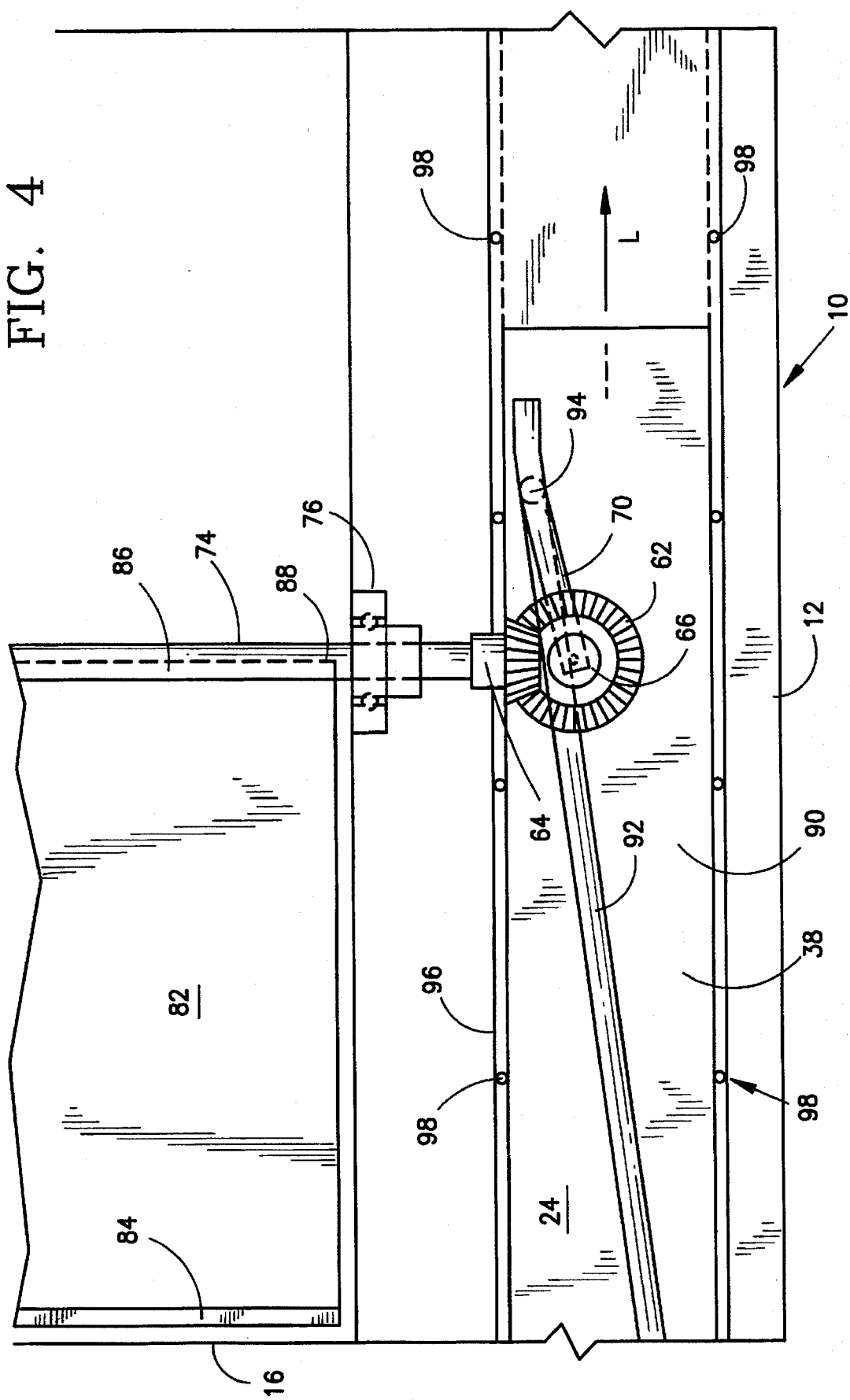
FIG. 4 is a side cutaway, partially schematic view of the gearing, sign, and internal extension of the plunger as viewed from direction B—B in FIG. 3.

Shown schematically in FIG. 2 is gearbox 60, which is located approximately twelve to eighteen inches from the forward end cap 32 of the casing. FIGS. 3 and 4 illustrate the gearbox 60 and its components in more detail, and also illustrate the gearing system used to rotate or pivot sign 20. In FIG. 3, it can be seen that gearbox 60 is housed within casing 12 and is constructed of steel or aluminum plate (or other material of suitable strength), and occupies roughly half of the width of the casing. Gearbox 60 preferably contains a pair of meshing bevel gears, a driving gear 62 and a driven gear 64, disposed at a right-angle orientation to each other.

Driving gear 62 is fixedly mounted, as by press fit or set screw(s), onto driving shaft 66. An inner end of driving shaft is carried in bearing assembly 68, or, alternatively a simple block having a cylindrical opening, if it is determined that a bearing mounting is not required. An outer end of shaft 66 extends through bore 61 in gearbox 60, and has a follower arm 70 extending radially therefrom, the purpose of which will be described in greater detail later. If desired, a gear retainer 72 mounted to the floor of gearbox 60 may be employed to ensure that driving gear 62 will not move or deflect outwardly under load such that the gears become unmeshed. The gear retainer can simply be a plate that presents an obstacle at the back face of the gear, preventing the gear from moving outwardly (to the left in FIG. 3).

The driven gear 64 is secured to driven shaft 74, which extends vertically upwardly through a bearing block 76 disposed at the upper wall of gearbox 60 and through an opening in the upper surface of casing 12. Driven shaft 74 extends upwardly through the entire height of sign housing 16, and an upper end of the shaft is preferably retained in an upper shaft bearing 78. Alternatively, the upper end of driven shaft 74 may be retained in a simple cylindrical cup, or it is possible that the shaft could be unrestrained provided it is of sufficient rigidity to remain in a vertical orientation.

Driven shaft 74 can be retained in its proper vertical position by various means, including by press fitting the shaft to an inner bearing member that is itself retained in position in bearing block 76 in a known manner. Alternatively, a radially extending stop flange 80 may be fixed on shaft 74, the stop flange being of a size that interference with the casing surrounding the opening in the casing will prevent the shaft from moving vertically downwardly. It is to be noted that the gear positioning and the inability of the driven shaft to deflect out of position itself may be adequate in some instances to prevent the shaft from moving vertically downwardly, but, in general, it is preferable to not place such load on the gear pair, as it may decrease the efficiency of the gear pair or cause binding of the gears to occur.

Sign 20 (see also FIGS. 5A–C) is of approximately a T-shape in cross-section, when viewed from above, and is made of a flat plate 82, with an outer flange 84 affixed at an outer edge of the plate 82, at substantially a right angle to the plate. The inner edge 86 of the plate 82 is preferably inserted into a vertically extending slot 88 in driven shaft 74, and may be secured thereto by tack weld, spot weld, full weld, or by conventional fastening devices. Sign housing 16 is preferably on the order of thirteen inches high, and the height of the sign itself will preferably be between twelve and thirteen inches high. With sign 20 secured to driven shaft 74, when driven shaft is rotated, in a manner that will be described below, the sign will also pivot or rotate with the driven shaft.

FIGS. 3 and 4 in combination show how the driven shaft 74 and sign 20 are rotated when the plunger 14 extending from the rear of casing 12 is pushed forward into the casing as the truck approaches the loading dock. FIG. 4 illustrates the plunger beam 24 and the driving and driven gears 62, 64, omitting the details of the mounting of the gears. The terminal end 90 of the reduced width beam section 38 is provided with a slot 92 cut therethrough that descends at a predetermined angle relative to a longitudinal axis L of the beam, which is preferably in a horizontal orientation, in a direction running from the end 90 of the beam rearwardly toward plunger 14.

Follower arm 70 extends radially outwardly from driving shaft 66, and has a transversely extending (relative to follower arm 70, see FIG. 3) tab 94, which extends along an axis parallel to the longitudinal axis of shaft 66. Tab 94 is of a length sufficient to extend into slot 92 of plunger beam 24, and is of a cross-sectional dimension slightly smaller than the width of the slot. Shown substantially schematically in both of FIGS. 3 and 4, a rail guide 96, containing a plurality of bearings 98, is provided to smoothly guide at least the terminal end 90 of plunger beam 24 as it moves in concert with the retraction and extension of plunger 14. The rail guide is mounted to the interior surface of the outer wall of casing 12, and in addition to providing a low friction guide, it provides the structural support that will ensure that the plunger beam will remain at its proper elevation inside the casing.

Figure 5A:
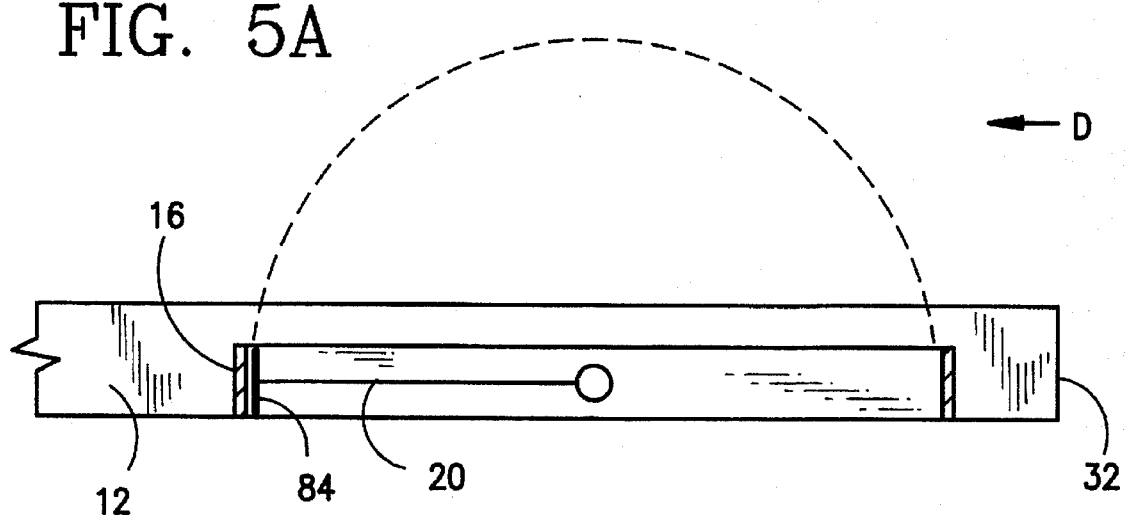
FIGS. 5A–C are top plan views, in substantially schematic form, of the sign housing and sign of the present invention.
Figure 5B:
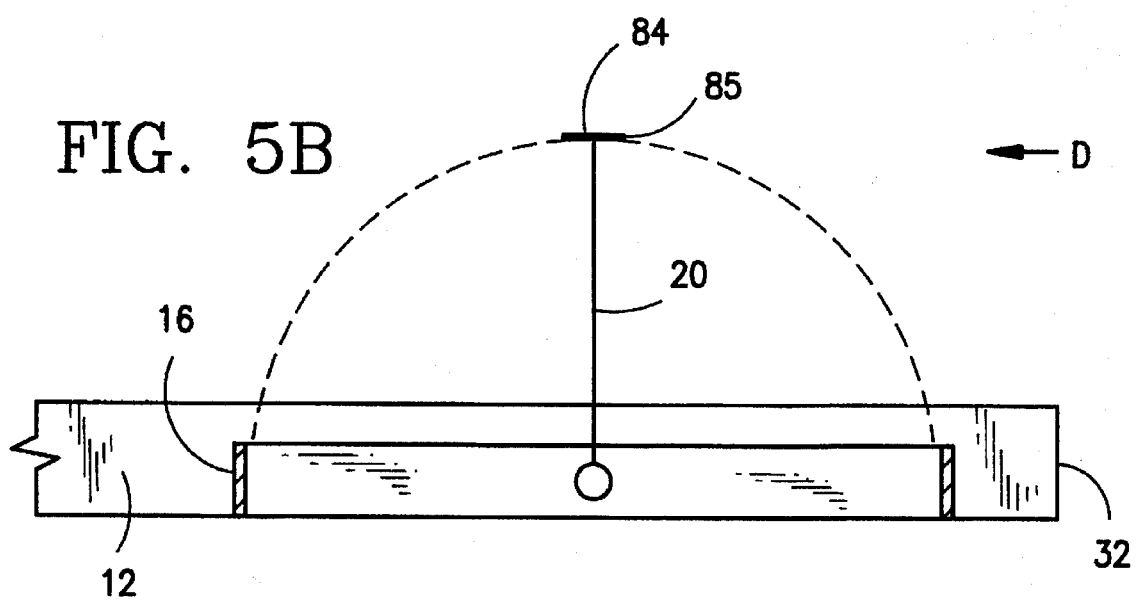
Figure 5C:
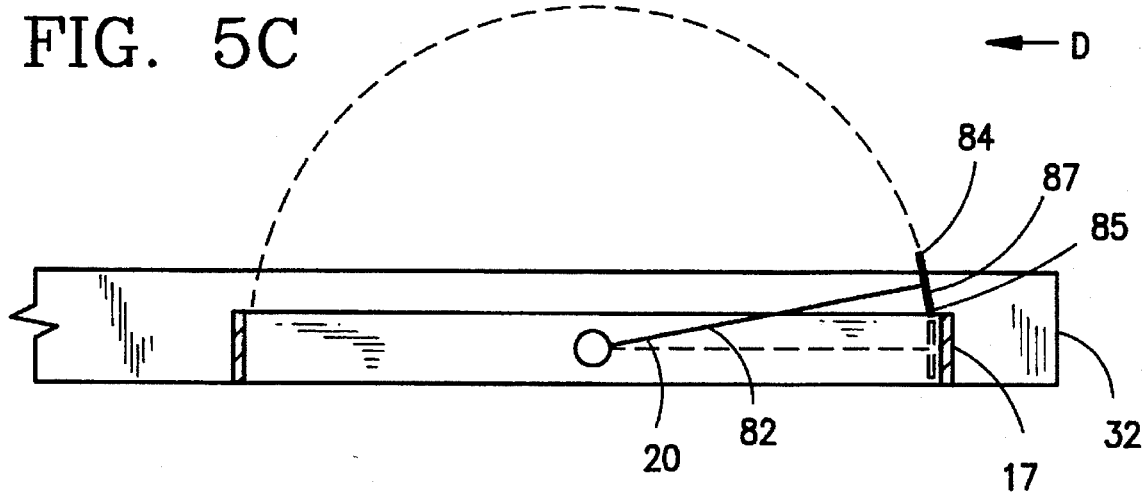

It will be seen with reference to FIG. 4 that, as the plunger beam 24 is moved forward toward the front of the truck (to the right in FIG. 4), as a result of plunger 14 being pushed forward and inwardly into the casing 12, the upper surface of slot 92 will force tab 94, and follower arm 70 to rotate in a downward (or clockwise, as shown) direction. This rotation causes driving shaft 66 and driving gear 62 to also move in a clockwise direction. The rotation of driving gear 62 in turn rotates driven gear 64 in a clockwise direction, as viewed from above, as in FIGS. 5A–C. Driven shaft 74, which is coupled to, and is preferably affixed to, driven gear 64, thus rotates in a clockwise direction, sweeping sign 20 through an arc as seen in FIGS. 5A–C. With the assembly 10 being mounted on the driver's side of the truck, this clockwise rotation causes the sign 20 to rotate or pivot in a direction toward the front of the truck.

The angle of descent of the slot 92 and the size, including relative size, of the gears, are selected, in a manner that will be readily apparent to those of ordinary skill in the art, such that the driven shaft 74 and sign 20 mounted thereon, will rotate through 180° as the plunger 14 moves the distance from its fully extended position to its fully retracted position, generally preferably on the order of ten inches. It will be readily apparent that if a different plunger range of travel is desired, such as twelve or eighteen inches, it will generally be possible to select a slot descent angle and appropriate gear sizes such that the sign will rotate 180° as the plunger moves that distance.

As discussed previously in the specification, as plunger and plunger beam move forward as the plunger is retracted, pin 26 advances in a forward direction in slot 22. Upon reaching the forward extent 28 of the slot, the pin will drop into catch 23, thereby locking the plunger in its fully retracted position. In this position, the sign 20 has completed a full 180° rotation toward the front of the truck, and the sign will remain in that forward position when the truck 100 takes to the roads. Upon driver activation of the plunger at a loading dock site, as also previously discussed, as the pin is freed from the catch and as the plunger is moved to its extended position by the biasing force of compression spring 44.

A highly effective distance gauging function is provided by the present assembly. In particular an assembly that employs rotating a sign that is initially not visible to the driver, being housed within sign housing 16, and is then visible and increases in apparent size as the sign approaches a perpendicular orientation to the truck, then decreases in apparent size, and finally presents a highly visible indicator that the truck has reached the point of closest approach, namely, the disappearance of the sign into the front portion of the sign housing, is very effective in signaling to the driver, beginning at a point at which the truck is ten inches away from the loading dock, how much distance remains between the truck and the wall. The indication is generally qualitative and not quantitative in nature, meaning that the indication is not given in terms of number of inches, which is believed will be readily embraced by truck drivers, who are accustomed to judging clearances and distances by qualitative techniques.

FIGS. 5A–C illustrate the position of sign 20 at its two extreme positions, and at the midpoint (90°) of its rotation. Arrow D indicates the direction from which the driver will be viewing the indicator. It can be seen that the sign housing 16 is of a depth substantially equal to the width of outer flange 84 of sign 20, and, as such, no portion of the sign will be visible to the driver when the plunger 14 is fully extended, as seen in FIG. 5A.

The arc swept by the sign is represented in broken lines in these figures. It will be recognized that, in moving from the sign position in FIG. 5A to the position shown in FIG. 5B, the apparent size of the sign, as viewed by the driver, will increase until the sign is fully perpendicular to the side of the truck. As the sign rotates past this point, the apparent size of the sign begins to decrease, giving the driver an indication that the truck is within five inches (one half of the initial ten inch plunger extension) of the loading dock.

Figure 6A:
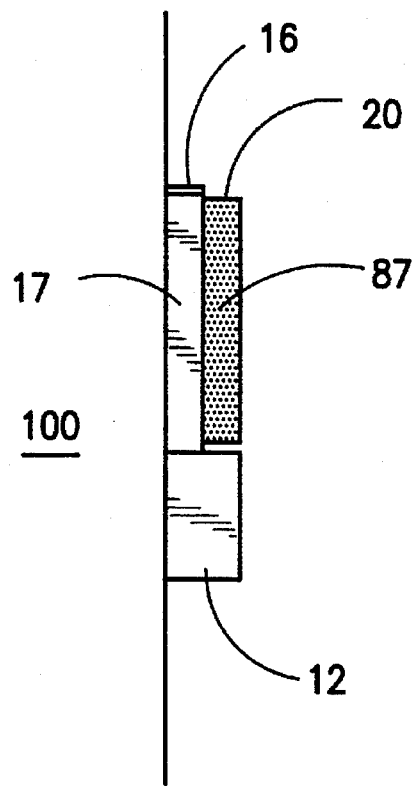
FIGS. 6A–B are elevation views of the sign and sign housing, as viewed from the driver's vantage point.
Figure 6B:
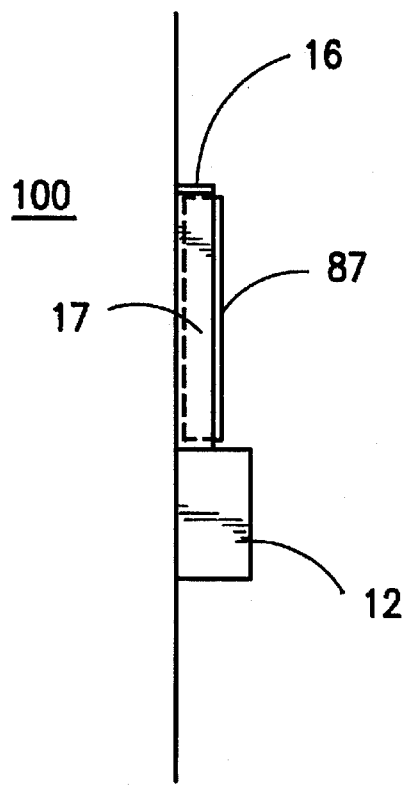

Turning to FIG. 5C, as the truck moves even closer to the loading dock, the size of the sign decreases, and the flat plate 82 portion of the sign eventually is hidden from sight by the wall 17 of the sign housing and the outer flange 84, as the leading edge 85 of the flange begins to enter the housing 16. The outer surface 87 of the flange now visible to the driver is preferably painted or coated with a high visibility coating, such as a bright or fluorescent color or a color that creates a high degree of contrast with the color of the wall 17 of the sign housing that is visible to the driver. As can be seen in FIGS. 6A and 6B, where surface 87 is shown in solid marking to represent the bright or high contrast color, the driver will be able to gauge the approximately last inch of approach by viewing the outer edge of the flange as it disappears behind the wall 17 of the sign housing 16. Again, this sighting system is believed to provide a highly effective way for the driver to controllably back a truck into contact or into very close proximity with a loading dock or other object. The system eliminates having to rely on mirrors mounted to the loading dock showing the back end of the truck, or on potentially inaccurate or misleading signals given by loading dock personnel, and eliminates, where those aids are not available, the need to stop several times to get out and see how much closer the truck needs to be, and prevents damage to the truck or to the object resulting from not using any aids or from using inaccurate aids.

It is to be understood that the foregoing description of the preferred embodiments of the present invention is for illustrative purposes, and many variations will become apparent to those of ordinary skill in the art upon reading this disclosure and viewing the figures forming a part of this disclosure. Such variations do not depart from the spirit and scope of the present invention, and the scope of the invention is to be determined by reference to the appended claims.

What is claimed is:

1. A distance gauge adapted to be mounted on a vehicle comprising:

a plunger adapted to travel between an extended position and a retracted position;

a biasing element so constructed and arranged to apply a biasing force on said plunger to bias said plunger toward said extended position;

an indicator sign adapted to be mounted at a position rearward of a driver's seat of said vehicle and at an exterior of said vehicle, said indicator sign being operatively coupled to said plunger such that said indicator sign moves from a first position when said plunger is at said extended position, to a second position when said plunger is at said retracted position, whereby said indicator sign is viewable by a driver in a sideview mirror of said vehicle as said sign moves from said first position toward said second position;

a sign housing disposed about the periphery of said indicator sign, said housing being of sufficient size to, and being positioned to, prevent a driver of said vehicle from viewing said indicator sign when said sign is moved to said second position.

2. A distance gauge as recited in claim 1, further comprising a plunger beam integral with said plunger and extending from said plunger to a location adjacent said indicator sign, said plunger beam being operatively coupled to said indicator.

3. A distance gauge as recited in claim 2, further comprising a first gear operatively coupled to said plunger beam and a second gear operatively coupled to said indicator sign, said first and second gears being so constructed and arranged to be in meshing engagement when installed on said vehicle.

4. A distance gauge as recited in claim 3, wherein said first gear is a bevel gear and said second gear is a bevel gear.

5. A distance gauge as recited in claim 4, wherein said second gear is oriented substantially horizontally, and further comprising a vertically oriented driven shaft operatively coupling said second gear to said indicator sign, said indicator sign being pivotable from said first position to said second position about a vertical axis about which said driven shaft and said second gear rotate.

6. A distance gauge as recited in claim 5, further comprising a horizontally oriented driving shaft secured to said first gear, said driving shaft also having a follower arm extending therefrom, said follower arm being operatively coupled to said plunger beam.

7. A distance gauge as recited in claim 6, further comprising a slot extending along at least a terminal end of said plunger beam, opposite an end at which said plunger is positioned, said slot being positioned to receive a tab portion of said follower arm therein and wherein said slot descends at a predetermined angle relative to horizontal, in a direction from said terminal end toward said plunger.

8. A distance gauge as recited in claim 7, wherein said tab portion of said follower arm is engaged in said slot of said plunger beam such that, as said plunger and said integral plunger beam are moved from said extended position toward said retracted position, said slot causes said follower arm to move in a vertical direction, rotating said driving shaft and said first gear.

9. A distance gauge as recited in claim 8, wherein a size of said first and said second gears, and an angle of descent of said slot in said plunger beam are selected such that said sign is pivoted substantially through 180° as said plunger moves from said extended position to said retracted position.

10. A distance gauge as recited in claim 9, wherein a distance traveled by said plunger in moving from said extended position to said retracted position is on the order of ten inches.

11. A distance gauge as recited in claim 2, further comprising a casing surrounding said plunger beam, said casing having an opening at a rear end thereof to permit said plunger to move from said extended position outside of said casing to said retracted position, at which only a rearmost end of said plunger is outside said casing.

12. A distance gauge as recited in claim 11, wherein said casing has a horizontally oriented slot extending along a portion of a length thereof, said slot having a downwardly extending catch at an end of said slot nearest a forward end of said casing, and wherein said plunger beam has a pin extending laterally therefrom, said pin extending through said slot to an outside of said casing, and adapted to ride in said slot, and wherein, when said pin reaches said forward end of said slot, said pin will drop into said catch, restraining said plunger beam and said plunger at that position.

13. A distance gauge as recited in claim 12, wherein said forward end of said slot and a rear end of said slot, in cooperation with said pin extending therethrough from said plunger beam, define limits of travel of said plunger beam and plunger, such that, when said pin prevents said plunger beam from moving to the rear, said plunger beam and said plunger are at said extended position, and when said pin prevents said plunger beam and said plunger from moving forward, said plunger beam and said plunger are at said retracted position.

14. A distance gauge as recited in claim 2, wherein at least a terminal end of said plunger beam, opposite an end at which said plunger is positioned, is supported by upper and lower guide rails and a plurality of bearings, wherein smooth movement of said plunger beam is effected.

15. A distance gauge as recited in claim 1, wherein said indicator sign is mounted on a vertical shaft and is pivotable between said first position and said second position, said first position being in a direction toward a rear of said vehicle relative to said shaft, and wherein said second position is in a direction toward a front of said vehicle relative to said shaft.

16. A distance gauge as recited in claim 15, wherein said indicator sign comprises a flat plate secured to said shaft along a first edge, said flat plate having a flange secured at a second edge opposite said first edge, said flange being oriented substantially perpendicularly with respect to said flat plate.

17. A distance gauge as recited in claim 16, wherein an outer surface of said flange facing away from said flat plate is coated with a high visibility coating.

18. A distance gauge as recited in claim 17, wherein said high visibility coating is a high contrast coating, providing a high degree of contrast between said outer surface and a surface of said sign housing.

19. A distance gauge as recited in claim 1, wherein said biasing element comprises a compression spring operatively coupled to said plunger at a first end of said spring, and said spring is fixed at a second end thereof to a stationary object on said distance gauge.

20. A vehicle having a distance gauge secured thereto, said distance gauge further comprising:

fasteners for fastening said distance gauge to said vehicle at a position whereby an indicator sign is positioned rearwardly of a driver's seat of said vehicle and is viewable by a driver along a driver's side of said vehicle;

a plunger operable to travel between an extended position and a retracted position, said extended position being a position projecting rearwardly beyond a rear extent of said vehicle, and said retracted position being a position approximately at said rear extent of said vehicle;

biasing means for biasing said plunger in a direction toward said extended position;

an indicator sign operable to move between a first position and a second position;

a sign housing sized to extend around a periphery of said indicator sign when said indicator sign is at said first position and when said indicator sign is at said second position;

said plunger and said indicator sign being operatively coupled such that, when said plunger is moved in a direction from said extended position to said retracted position, said sign will move from said first position to said second position; and wherein said indicator sign and said sign housing are so constructed and arranged that, as said indicator sign moves from said first position to said second position, said indicator sign is viewable by a driver of said vehicle, and as said sign approaches said second position, said indicator sign begins to enter said sign housing, and, when said indicator sign reaches said second position, said indicator sign is fully within said sign housing.

* * * * *